United States Patent
Guo et al.

(10) Patent No.: US 8,321,500 B2
(45) Date of Patent: Nov. 27, 2012

(54) METHOD AND SYSTEM FOR GENERATING MESSAGES

(75) Inventors: Ying Chun Guo, Beijing (CN); Min Li, Beijing (CN); Indrajit Poddar, Sewickley, PA (US); Naveen Sachdeva, Sewickley, PA (US); Qiang Wang, Beijing (CN); Li Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/277,995

(22) Filed: Nov. 25, 2008

(65) Prior Publication Data
US 2009/0138585 A1   May 28, 2009

(30) Foreign Application Priority Data
Nov. 27, 2007   (CN) .......................... 2007 1 0196411

(51) Int. Cl.
*G06F 15/16* (2006.01)
(52) U.S. Cl. .......................... 709/203; 709/218; 709/223
(58) Field of Classification Search .................. 709/203, 709/218, 223
See application file for complete search history.

(56) References Cited

U.S. PATENT DOCUMENTS

| | | | | |
|---|---|---|---|---|
| 6,981,029 | B1 * | 12/2005 | Menditto et al. | 709/217 |
| 7,389,328 | B2 * | 6/2008 | Yeung et al. | 709/218 |
| 7,702,724 | B1 * | 4/2010 | Brydon et al. | 709/203 |
| 8,032,609 | B2 * | 10/2011 | Rogers et al. | 709/217 |
| 2001/0003203 | A1 * | 6/2001 | Mache | 713/201 |
| 2007/0094387 | A1 * | 4/2007 | Hahn et al. | 709/224 |

FOREIGN PATENT DOCUMENTS
WO   WO2004072885 A1   8/2004

* cited by examiner

*Primary Examiner* — Ario Etienne
*Assistant Examiner* — Michael C Lai
(74) *Attorney, Agent, or Firm* — Steven E. Bach

(57) ABSTRACT

The present invention discloses a method and system for generating Simple Object Access Protocol (SOAP) message, wherein, at least one first information sets are pre-stored and each of the first information sets contains at least one piece of information. The method comprises: generating a first SOAP message which contains a second information set that contains at least one piece of information; retrieving a first information set that corresponds to the second information set; and generating a second SOAP message using the retrieved first information set and the first SOAP message.

12 Claims, 5 Drawing Sheets

(PRIOR ART)

METHOD AND SYSTEM FOR GENERATING MESSAGES

FIELD OF THE INVENTION

The present invention generally relates to generating messages in a computer system, and more particularly to a method and system for generating messages in Service-Oriented Architecture (SOA).

BACKGROUND OF THE INVENTION

In existing Service-Oriented Architecture (SOA) systems, a Service Provider provides a service, and a Service Consumer invokes the service. In the applications of Service-Oriented Architecture, a Service Consumer is not generally a final user, such as one of the consumers of a bank, but might be the developer who develops service-invoking programs, or the service-invoking program itself (e.g., service-invoking client program). The above fact is well known to a person of skill in the art. The Service consumer needs two types of information: service address, i.e. endpoint; and service interface information, which is normally described in Web Service Description Language (WSDL), wherein the service interface information is like a contract agreed to between the Service Provider and the Service Consumer. The service interface information specifies the information that a service provider asks a service consumer to provide and the format of the information, and once the interface information is specified, it will not change frequently.

In order to invoke a service, a service consumer needs to generate messages of a certain format according to the WSDL, e.g. a Simple Object Access Protocol (SOAP) message, and then send the messages to a service realization endpoint of a service to invoke the service. Each service may contain multiple different service realization endpoints, e.g. each service realization endpoint may correspond to a different service quality.

In a simple architecture of SOA, it is only necessary to have a service provider and a service consumer. However, in a complex architecture of SOA, a module may be provided between a service provider and a service consumer, which is normally called "message mediation". The message mediation is used for handling the routings of service request messages among multiple service providers (i.e. specifying by which service provider a request message of a service shall be handled and the service provided and to which service realization endpoint the request message is sent). The above message mediation also needs some extra information (i.e. property information) to finalize the routings of the messages.

The property information can be constants, or values through calculations on the service interface information. When a system architecture designer designs the whole system, he can make the routing policies according to his specific business requirements, and then, input items for the property information can be set according to these specific routing policies. Service consumers input the requested property information when requesting the services.

For example, FIG. 1 depicts a system 100 of prior art for invoking services, which shows a general architecture for the application of a Service-Oriented Architecture.

The system 100 in FIG. 1 comprises a message mediation 120 and a service 110. The service 110 contains multiple service realization endpoints (e.g., service realization endpoint A, B, C etc.). The service can be a Web Service.

The message mediation 120 includes a semantic mediation engine 121 and a service metadata repository 122. The policies and the service realization endpoints (e.g. A, B, C etc.) are stored in the service metadata repository 122.

As shown in FIG. 1, the service consumer (not shown) will send a SOAP requesting message which contains the property information to the semantic mediation engine 121 in the message mediation 120. Wherein, the property information can, for example, be responding time, credit value etc.

The semantic mediation engine 121 will retrieve the service metadata repository 122 based on the property information in the header of the SOAP requesting message, in order to retrieve a proper service realization endpoint according to corresponding policies, and then dynamically route the requesting message to the proper service realization endpoint 110-A, 110-B or 110-C (here 110-A in FIG. 1) based on the retrieved endpoint, thereby finalizing a service invoking procedure.

In existing Web service SOA systems, a method for passing messages based on text (actually based on Extensible Markup Language—XML) is provided. For instance, Simple Object Access Protocol (SOAP) is a standard method for invoking Web services. The format of a SOAP message is defined in the specification of SOAP, wherein, a SOAP message includes a SOAP envelop, a SOAP message header and a SOAP message body. SOAP messages are based on XML.

The SOAP message header can provide information regarding the message itself, e.g. the property information used for routing described above. The SOAP message body is used for providing information for the application, i.e. the service interface information. The mediation engine normally adopts the property information in the message header to make routing decisions, since this can reduce the time for the analysis for the SOAP message body. The following is an example of a SOAP message.

```
<?xml version="1.0"?>
<SOAP-ENV:Envelope
xmlns:SOAP-ENV="http://schemas.xmlsoap.org/soap/envelope/"  >
    < SOAP-ENV:Header>
        <t1:score xmlns:t1="http://www.ibm.com/abc">120
        </t1:score>
    </ SOAP-ENV:Header>
    <SOAP-ENV:Body>
        <m:getListOfModels xmlns:m="urn:MobilePhoneservice"  >
        </m:getListOfModels>
    </SOAP-ENV:Body>
</SOAP-ENV:Envelope>
```

When a client sends a SOAP message to a server, the SOAP message can be transmitted with HTTP protocol. This is called a binding of SOAP and HTTP. In order to send a SOAP/HTTP request, it is necessary to provide a SOAPAction field in the HTTP header. The SOAPAction specifies the destination of the SOAP request. The following is an example of a message for the binding of SOAP and HTTP protocol.

```
POST /Vendors HTTP/1.1
Host: www.mobilephoneservice.com
Content-Type:"text/xml";Charset="utf-8"
Content-Length: nnnn
SOAPACtion:"www.mobilephoneservice.com/Vendors/
MobilePhoneservice
#getListOfModels"
<?xml version="1.0"?>
<SOAP-ENV:Envelope
xmlns:SOAP-ENV="http://schemas.xmlsoap.org/soap/envelope/"  >
    < SOAP-ENV:Header>
```

-continued

```
        <t1:score xmlns:t1="http://www.ibm.com/abc">120
        </t1:score>
    </ SOAP-ENV:Header>
    <SOAP-ENV:Body>
        <m:getListOfModels xmlns:m="urn:MobilePhoneservice" >
        </m:getListOfModels>
    </SOAP-ENV:Body>
</SOAP-ENV:Envelope>
```

It is apparent that SOAP messages are based on XML, wherein, the process to produce a SOAP message is to make up a XML file, while the destination address of the SOAP message is provide in the HTTP header.

In the developing process of a client program which invokes Web services, the construction of a SOAP message (XML file) is rather burdensome. Luckily, there exist many mature applications, which can produce client code for invoking corresponding Web services according to Web Service Description Language (WSDL). For instance, WSDL2Java application can produce Java code according to WSDL, wherein a client program developer can set the parameters of invoking services through manipulating Java objects, and the SOAP messages based on XML will be automatically generated, facilitating the development of client developers to a great degree. Meanwhile, the Java code of a Web service client also provides the function of setting the transmitting destination address of the SOAP message, i.e. an Application Program Interface (API) is provided for setting the destination address in the HTTP header.

In existing systems, after the SOAP message has been generated, there exist two ways to insert property information into the header of a SOAP message. One way is to develop a Web service handling program, in which, the XML file is manipulated through an API in order to insert necessary property information into the header of the SOAP message. The other way is to add explicit SOAP message header definition by manually modifying WSDL, so as to generate a new client Java code by the modified WSDL. Because the client Java code includes APIs designed to manipulate the header of the SOAP message, it is possible to set the value of the header of the SOAP message by a manner of manipulating Java objects. Both of the ways will introduce extra work into the development of the client program. Moreover, manual operations by developers will lead to a higher percent of errors.

SUMMARY OF THE INVENTION

In order to solve the above problem and to achieve various advantages, the present invention provides a solution for generating Simple Object Access Protocol (SOAP) messages.

According to a first aspect of the present invention, a method for generating Simple Object Access Protocol (SOAP) messages is provided, wherein, at least one first information sets are pre-stored, each of which contains at least one piece of information. The method comprises: generating a first SOAP message, which includes a second information set that contains at least one piece of information; retrieving a first information set corresponding to the second information set; and generating a second SOAP message based on both the retrieved first information set and the second information set.

According to one embodiment of the first aspect of the present invention, the method further comprises sending the second SOAP message to a service mediation in order to invoke a service.

According to another embodiment of the first aspect of the present invention, the first information sets contain property information, which is used by the service mediation for dynamically routing the second SOAP message to a corresponding service realization endpoint.

According to another embodiment of the first aspect of the present invention, the second information set contains service interface information necessary for invoking a service.

According to another embodiment of the first aspect of the present invention, the second information set is provided in the body of the first SOAP message, and the method comprises: inserting the first information set into the header of the first SOAP message to generate the second SOAP message.

According to another embodiment of the first aspect of the present invention, each of the at least one first information sets is associated with one unique endpoint, and the method further comprises: retrieving the first information set using the unique endpoint.

According to another embodiment of the first aspect of the present invention, the first SOAP message is encapsulated in a HTTP message, and the unique endpoint is written into the header of the HTTP message as the destination address.

According to a second aspect of the present invention, a system for generating SOAP messages is provided, which comprises: a repository, that pre-stores at least one first information set, each of which contains at least one piece of information; and a message handler, that is configured to receive a first SOAP message, wherein the first SOAP message contains a second information set that contains at least one piece of information, and wherein the message handler is further configured to retrieve a first information set corresponding to the second information set from the repository and generate a second SOAP message based on the retrieved first information set and the first SOAP message.

According to one embodiment of the second aspect of the present invention, the message handler is further configured to send the second SOAP message to a service mediation for invoking a service.

According to another embodiment of the second aspect of the present invention, the first information set contains property information, which is used by a service mediation to dynamically route the second SOAP message to a corresponding service realization endpoint.

According to another embodiment of the second aspect of the present invention, the second information set contains service interface information necessary for invoking a service.

According to another embodiment of the second aspect of the present invention, the second information set is provided in the body of the first SOAP message, and the message handler is further configured to generate the second SOAP message by inserting the first information set into the header of the first SOAP message.

According to another embodiment of the second aspect of the present invention, each of the at least one first information sets is associated with one unique endpoint, and the message handler is further configured to retrieve the first information set using the unique endpoint.

According to another embodiment of the second aspect of the present invention, the first SOAP message is encapsulated into a HTTP message, and the unique endpoint is written into the header of the HTTP message as the destination address.

In a sample method and system according to the present invention, in order to generate a SOAP message, a portion of information is first stored in the repository; then, the part of the information is retrieved from the repository to generate a desired SOAP message when a Web service is invoked.

Therefore, through the present invention, it is possible to a certain extent to improve the degree of automation of SOAP message generation. The present invention can further reduce the chances of errors during information input. The present invention can further reduce extra work for consumers.

In a sample embodiment of the present invention, a unique endpoint is used to identify the information necessary for inserting into the SOAP message. Therefore, input at the client terminal by a service consumer can be simplified through the present invention.

In a sample embodiment of the present invention, the unique endpoint is transferred in the header of a HTTP message. Therefore, the development work of the designer can be simplified through the present invention.

In a sample embodiment of the present invention provided a novel architecture for invoking a web service.

BRIEF DESCRIPTION OF THE DRAWINGS

The present invention will be apparent through the following detailed description with reference to the drawings, wherein.

DETAILED DESCRIPTION OF THE INVENTION

Figure 1:
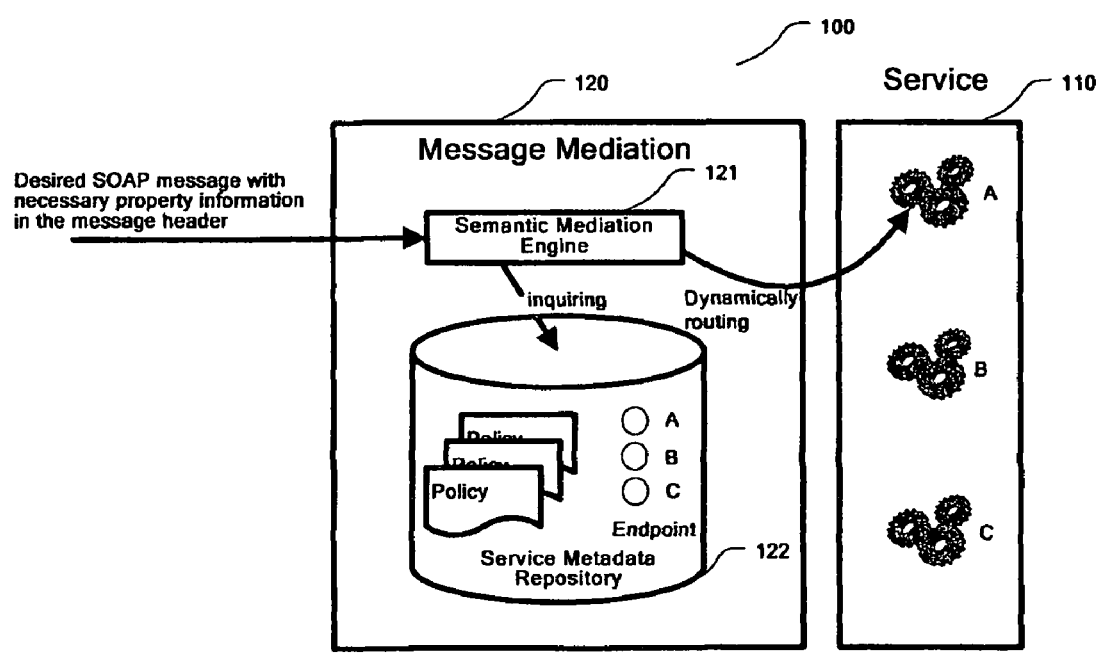
FIG. 1 shows a system of prior art for invoking a service.

Elements in the drawings are not necessarily drawn to scale. Also, in different figures, the same reference signs identify the same elements. Moreover, for the purpose of making the description clear and avoiding confusion, detailed descriptions of some well-known elements and steps are omitted.

It should be understood by a person skilled in the art that the previous description and the following detailed description are intended to be illustrative and not to limit the scope of the present invention.

Various sample embodiments of the present invention will be illustrated through the examples below.

Below, with reference to FIG. 2-5, an embodiment of the present invention is described with respect to a business application of a service-oriented architecture.

In existing systems, as previously stated with reference to FIG. 1, it is necessary for service consumers to provide the service interface information and the property information for dynamic routing of messages to the message mediation in order to invoke Web services in a business application of a service-oriented architecture. The message mediation will dynamically route the SOAP message to a service realization endpoint based on the property information. Wherein, at a client terminal, the service interface information is set into the body of the SOAP message and the property information is inserted into the header of the SOAP message. Extra work will be introduced into the development of a client program when inserting property information. Moreover, because the property information is manually input by developers, the probability of errors will also be increased.

Taking into consideration the above situation, sample embodiments of the present invention provide a novel technique for generating messages. According to embodiments of the present invention, the property information can be pre-stored in the subscription management system of the present invention. When a service consumer request a service, only the service interface information is necessary for the service consumer to input. Then, the subscription management system of the present invention will automatically retrieve the property information for the service consumer and generate the information necessary for the message mediation by combining the property information and the service interface information. The operation of a service consumer invoking a service can be simplified by using the present invention. Sample embodiments of the present invention can further reduce the possibility of errors that occur when manually inputting information to invoke a service. Embodiments of the present invention can also improve the degree of automation of the system and thus facilitate the management of system administrators.

Figure 2:
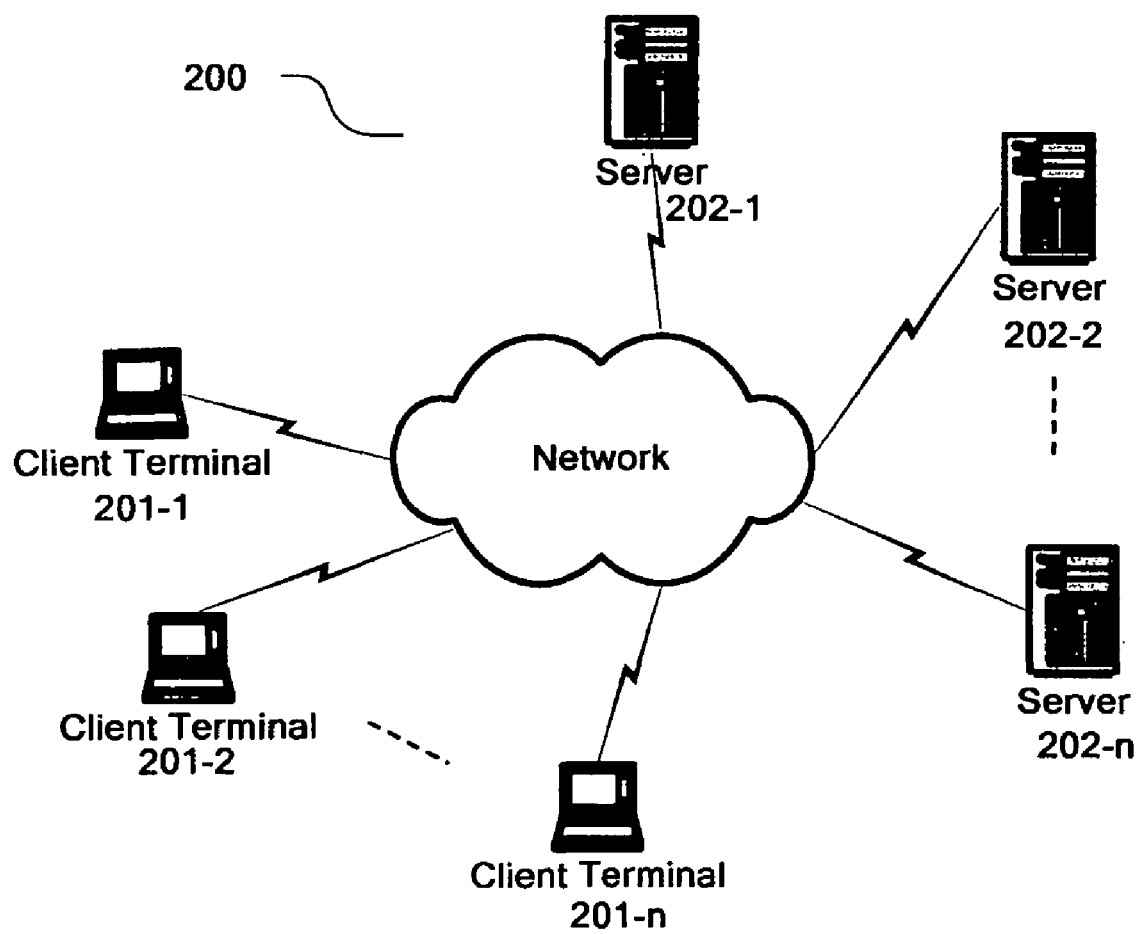
FIG. 2 is an illustration showing a network applicable for the present invention.

FIG. 2 shows a network environment 400 where the present invention is applicable. In the network 400 shown in FIG. 2, there are multiple client terminals 201-1, 201-2 . . . , 201-n and multiple servers 202-1, 202-2 . . . , 202-n.

Figure 3:
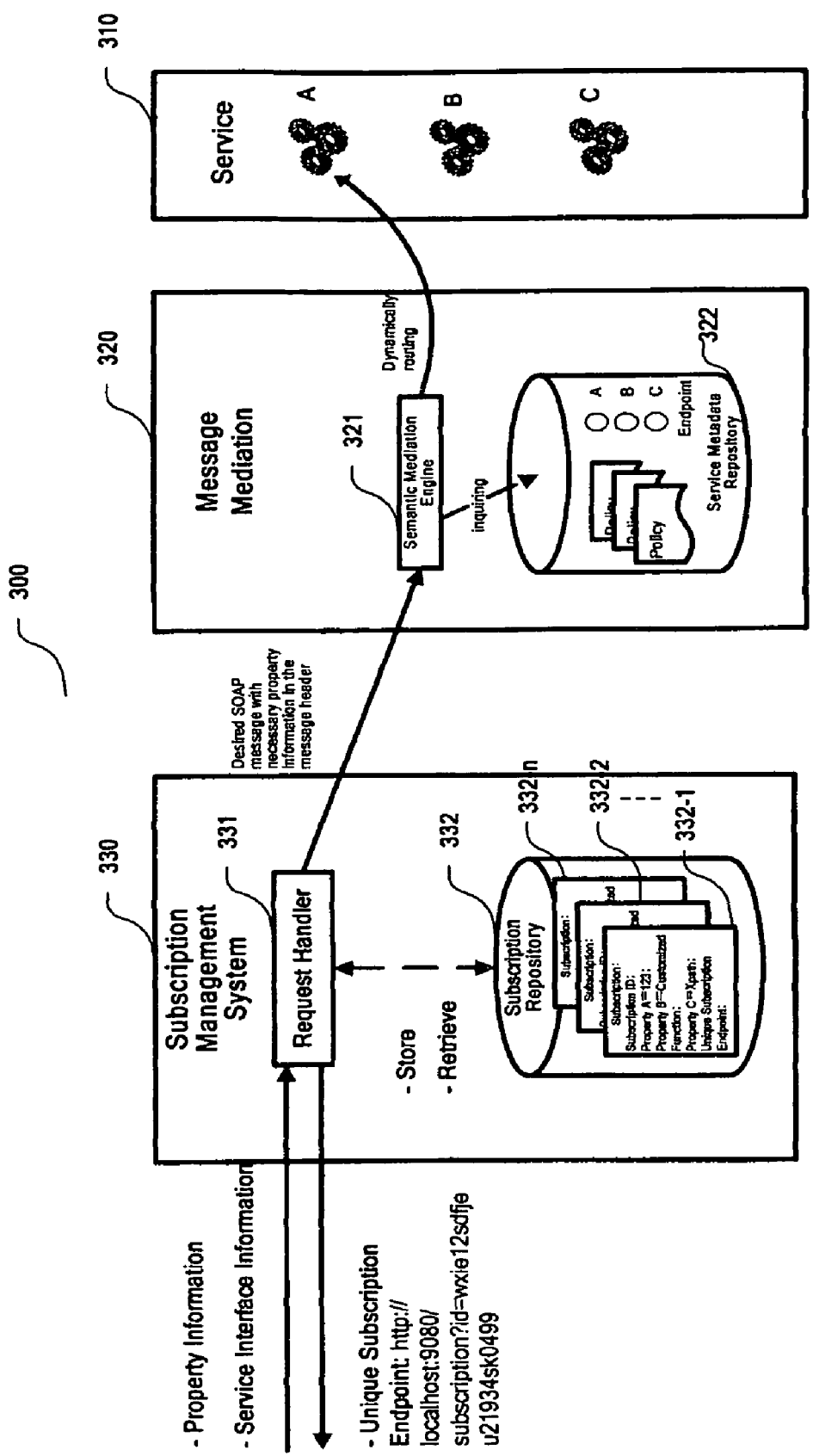
FIG. 3 is an illustration showing a system for subscribing and invoking services according to one embodiment of the present invention.

FIG. 3 shows an illustration of a system for subscribing and invoking a service according to one embodiment of the present invention.

The system shown in FIG. 3 includes a subscription management system 330, a message mediation 320 and a service 310. It should be understood by a person skilled in the art that, the subscription management system 330, the message mediation 320 and the service 310 can be in the same server, or be in different servers, or two of the subscription management system 330, the message mediation 320 and the service 310 are in one server and the other one is in a different server. For example, two or more of the servers can be connected through the internet as shown in FIG. 2, or can be connected through an intranet. In a sample embodiment, the connection can realized by wired connection or wireless connection etc.

The message mediation 320 comprises a semantic mediation engine 321 and a service metadata repository 322.

The subscription server 330 comprises a request handler 331 and a subscription repository 332.

The request handler 331 is used for receiving property information and/or service interface information.

In a specific embodiment according to the present invention, the property information is information necessary to dynamically route the generated message to a proper service realization endpoint, for example, the property information may include a response time or a calculation formula etc. necessary for the message mediation 320 to invoke a service, wherein the calculation formula may be e.g. XPath, which can be used for abstracting the credit value of a consumer from a message body and the like.

It is possible to pre-store the property information in the subscription repository 332 in various ways. For instance, in one embodiment, a user may notify a system administrator of property information via email, and the system administrator may input the property information into the subscription management system 330. In another embodiment, a service consumer can input property information through subscription process. Nevertheless, it is obvious to a person skilled in the art that many other ways can be used to pre-store property information in the subscription repository 332.

As above mentioned, the service interface information contains interface parameters of the services provided by the service provider, for example, the service interface information may be personal information of a user, such as user's name, gender, ID number etc.

The received property information is stored by the request handler 331 in the subscription repository 332.

The request handler 331 can retrieve the property information which corresponds to the received service interface information from the subscription repository 332.

There are many ways to retrieve the property information. In one embodiment of the present invention, when the subscription server 330 stores the property information in the subscription repository 332, the subscription server 330 will assign a unique subscription endpoint for each piece of the property information, and the unique subscription endpoint includes an address of the subscription server 330 and ID of the property information in the subscription repository 332. The subscription server 330 will return the unique subscription endpoint to the service consumer. The advantage of this way of retrieving property information lies in the fact that when a service consumer invokes a service at client terminal, he may put the unique subscription endpoint as a destination address in the header of a HTTP message in order to retrieve the corresponding property information in the subscription repository 332. For a person skilled in the art, modification to a HTTP message header is simple and easy. Besides, only one unique subscription endpoint would be used in place of the necessary property information in client programs. Therefore, this approach would simplify the development of the client programs. Besides, this way also reduces the possibility of errors at the client terminal. Of course, there are many other ways for retrieving property information. For example, property information can be retrieved by identification information which is used to identify the correlation between the property information and the service interface information.

The request handler 331 generates a desired message based on the user's service interface information and the retrieved property information. For example, the request handler 331 can insert the retrieved property information directly into the header of the SOAP message coming from the client terminal, wherein, the service interface information is contained in the body of the SOAP message. Then, the request handler 331 will send the desired message to the message mediation 320 for invoking a service.

The subscription repository 332 is used for storing property information. For example, the subscription repository 332 can assign one storage entry for each piece of the property information, e.g. entry 332-1, 332-2 . . . , 332-n. The subscription repository 332 may be a database, a table or any other means for storing information that may be known to a person skilled in the art.

The message mediation 320 and the service 310 receive the desired message from the subscription management system 330 and invoke the corresponding service. The message mediation 320 and the service 310 is well known in the art, e.g. they may operate according to the approach shown in FIG. 1.

Below, with reference to FIG. 3, the method for subscribing a service shown in FIG. 4 and the method for invoking a service shown in FIG. 5 will be described.

Figure 4:
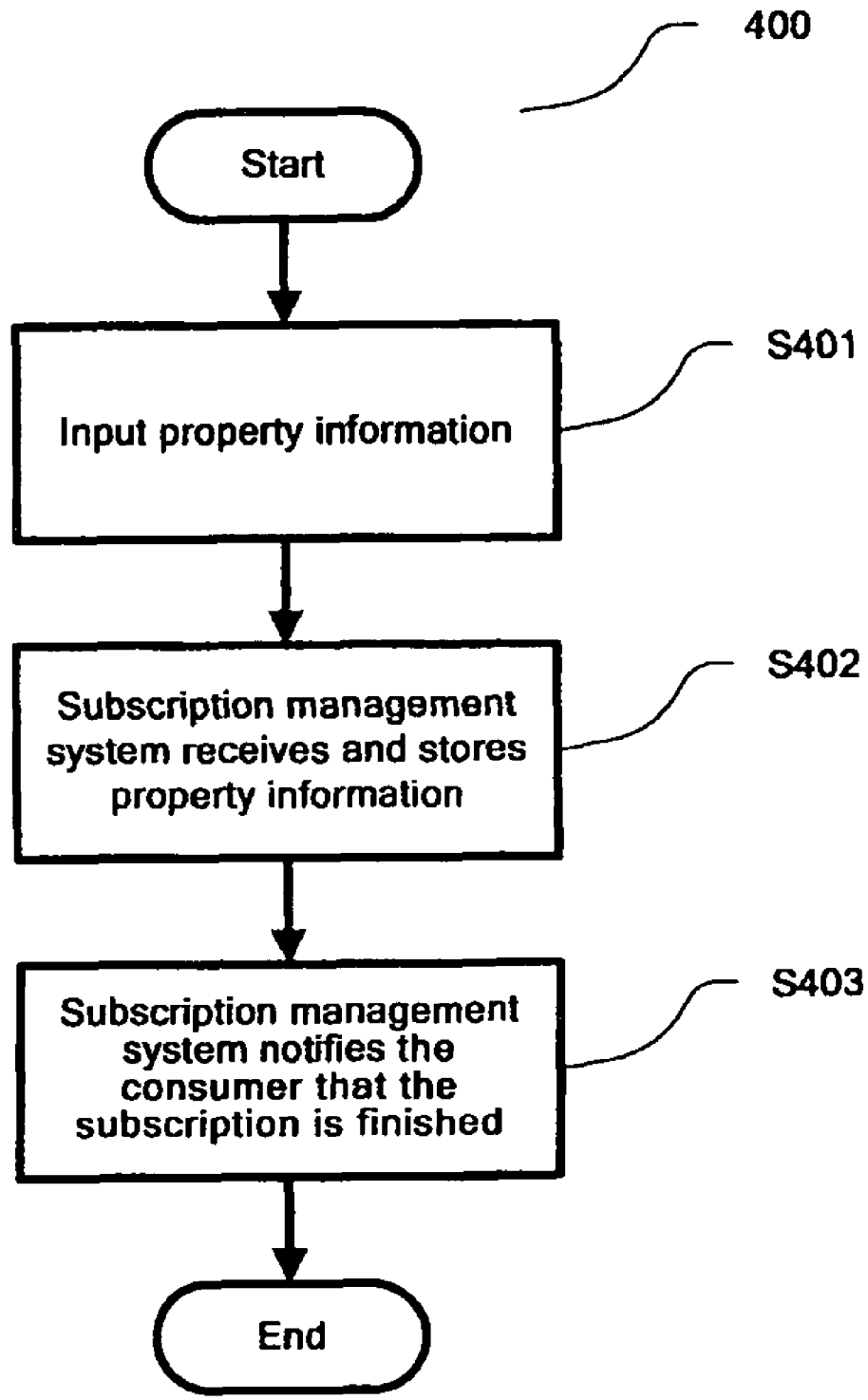
FIG. 4 is a flow chart showing a method for subscribing a service according to another embodiment of the present invention.

FIG. 4 is a flow chart of a method for subscribing a service according to one embodiment of the present invention.

As shown in FIG. 4, at step S401, a service consumer inputs property information. For example, the service consumer may input property information into a client terminal which then sends the property information to the subscription management system 330 through network.

At step S402, the subscription management system 330 receives the property information and stores it into the subscription repository 332.

As mentioned above, in one sample embodiment of the present invention, the subscription management system 330 can assign a unique subscription endpoint for each piece of property information, and store the property information in association with the unique subscription endpoint into the subscription repository 332.

At step S403, the subscription management system 330 notifies the service consumer that the subscription is finished. In one embodiment, the subscription management system 330 may communicate the unique subscription endpoint to the service consumer when notifying the finalization of subscription.

According to sample embodiments of the present invention, it is possible to store and manage the property information in the subscription management system 330 in a centralized manner. For example, when the format of the desired message by the message mediation 320 has changed, system administrators may not need to make reconfigurations for each client terminal or service consumer, but only need to update the request handler 331 in the subscription management system 330. Thus, sample embodiments of the present invention may provide a centralized management approach. Sample embodiments of the present invention may further simplify the operation of system administrators. also, for end users, sample embodiments of the present invention may provide means for automatic reconfiguration update.

Figure 5:
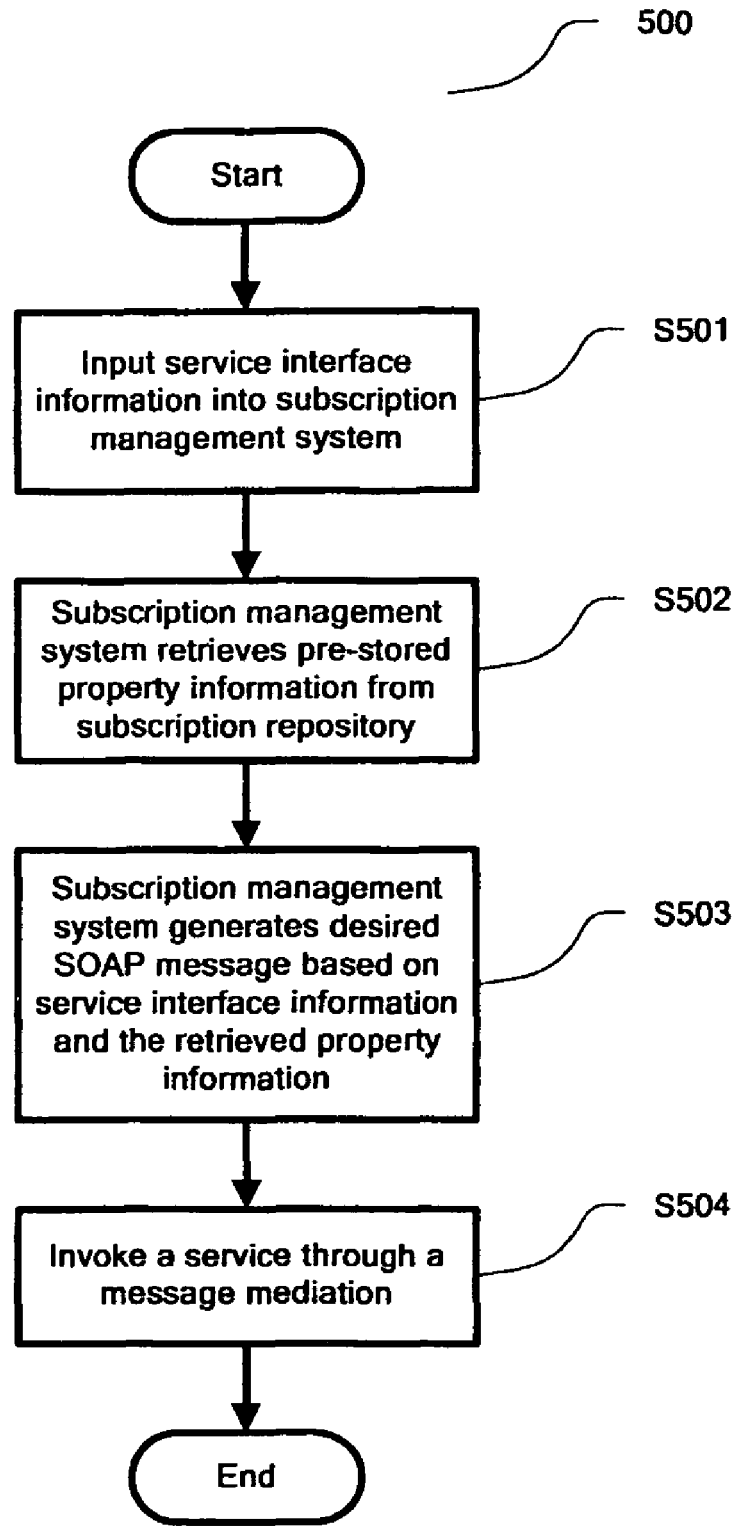
FIG. 5 is a flow chart showing a method for invoking a service according to another embodiment of the present invention.

FIG. 5 shows a method for invoking a service according to a sample embodiment of the present invention. As shown in FIG. 5, at step S501, a service consumer sends service interface information for invoking a service to the subscription management system 330. The service interface information is encapsulated in the SOAP message. For example, the service interface information may be encapsulated in the body of the SOAP message. It is possible to pass the service interface information by a method of binding of SOAP and HTTP, where a SOAP message is encapsulated in a HTTP message; and the unique subscription endpoint is written as the destination address into the header of the HTTP message. The service consumer may send the HTTP message to the subscription management system 330.

At step S502, after the subscription management system 330 receives the service interface information, it will retrieve the property information corresponding to the service interface information from the subscription repository 332. As mentioned above, there are many ways to retrieve the property information. For example, in one sample embodiment, the property information is retrieved based on a unique subscription endpoint.

At step S503, the subscription management system 330 will generate a desired SOAP message based on the service interface information and the retrieved property information. For example, the request handler 331 can insert the retrieved property information into the header of the SOAP message coming from the client terminal, wherein, the service interface information is contained in the body of the SOAP message. The request handler 331 may also adjust the format of the SOAP message if needed, for example, the format of the header of the SOAP message can be adjusted to comply with the requirement of the message mediation 320.

Optionally, at step S504, the subscription management system 330 may send the desired service invoking message to the message mediation 320 to invoke service. It is well know for a person skilled in the art how to invoke a service through the message mediation 320, and thus, it will not described in detail here.

Although some embodiments of the present invention are described using the example of SOAP message with respect to Web service, it should be understood by a person skilled in the art that the present invention can also be applied in many other situations and the messages are not limited to SOAP messages.

Below, with reference to FIG. 3, a sample embodiment of the present described for a credit card application process. It should be noted that the following description is intended to be illustrative but not to limit the scope of the present invention. In this example, a service consumer invokes a credit card application service through the system of a sample embodiment of the present invention.

The service consumer begins to subscribe the credit card application service.

For example, in one embodiment, the service consumer inputs property information through the client interface of the subscription management system. The property information can be used by the message mediation 320 to dynamically route a service invoking request SOAP message to a proper service realization endpoints e.g. A, B, or C etc.

During designing, designers may design proper routing policies, and determine the items of property information necessary to be input by service consumers according to the routing policies. In the credit card application service, for example, the message mediation 320 dynamically routes the service invoking request SOAP message according to a desired service response time and a client's credit value. Thus, in the subscription process, a service consumer needs to input a service response time and an XPath formula that points to the credit value field in the service invoking request SOAP message as the property information.

The input property information is submitted to the subscription management system 330. The subscription management system 330 can assign a unique subscription endpoint for each piece of the submitted property information, wherein, the unique subscription endpoint includes the address of the subscription management system 330 and a subscription ID for the property information in the subscription repository 332. The unique subscription endpoint may be, for example: http://localhost:9080/subscription?id=wxie12sdfjeu21934sk0499.

The subscription system 330 stores the property information in association with the unique subscription endpoint in the subscription repository 332.

The subscription management system 330 notifies the service consumer of the finalization of the subscription. The subscription management system 330 may also notify the service consumer of the unique subscription endpoint.

It is possible to subscribe many times, in order to store different property information in the subscription repository 332.

After finishing the subscription procedure, a service consumer can use the credit card application service in his own program. For example, in a case where the service consumer is the developer for a client interface for banks, he needs to provide a client interface, and after a bank users inputs his personal information and presses the button of "Begin the application for credit card", it begins to invoke the credit card application service.

The service consumer generates the service client code through WSDL of the service of applying for a credit card, inputs the service interface information through the client code, and generates a service invoking request SOAP message. The items for the service interface information are set by the service provider during building of the service. For example, the items for the service interface information may include user's name, gender, ID number, and credit value, etc.

According to a sample embodiment, the service interface information is included in the body of the service invoking request SOAP message.

Then, the service consumer sets the destination address through the API in the service client code, so that the service invoking request SOAP message is encapsulated in a HTTP message. A unique subscription endpoint is written into the header of the HTTP message as the destination address.

The service consumer sends the generated HTTP message to the subscription management system 330. The subscription management system 330 abstracts the unique subscription endpoint directly from the HTTP message, and retrieves corresponding property information from the subscription repository 332 according to the unique subscription endpoint. It is easy to manipulate the HTTP message. Thus, the development work for the subscription management system can be simplified by using the unique subscription endpoint to retrieve the property information in the present invention.

The subscription management system 330 inserts the retrieved property information directly into the header of the service invoking request SOAP message. The subscription management system 330 sends the service invoking request SOAP message to the message mediation 320.

The message mediation 320 receives the service invoking request SOAP message. The message mediation 320 abstracts the property information from the header of the service invoking request SOAP message, and dynamically routes the service invoking request SOAP message to a proper service realization endpoint, e.g. the service realization endpoint 310-A, 310-B or 310-C, based on the property information.

It is possible to carry out the method and system of the present invention in many ways. For example, it is possible to carry out the method and system of the present invention through software, hardware, firmware or any combination thereof. The above described order of the steps for the method for generating Simple Object Access Protocol (SOAP) messages are only intended to be illustrative, and the steps of the method of the present invention are not limited to the above specifically described order unless specifically stated. Also, in some embodiments, the present invention may also be embodied as programs recorded in recording medium, including machine-readable instructions for implementing a method according to an embodiment of the present invention. Thus, the present invention also covers the recording medium which stores the program for implementing the method according to the present invention.

Although some specific embodiments of the present invention have been described in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A computer-implemented method for generating Simple Object Access Protocol (SOAP) message, comprising:
   a server pre-storing at least one first information sets in a memory, each first information set comprises property information that causes the server to dynamically route a message to a service realization end point;

the server receiving a first SOAP message, wherein, the first SOAP message comprises a second information set which comprises at least one piece of service interface information;

the server retrieving one of the at least one first information sets corresponding to the second information set; and generating a second SOAP message comprising the retrieved first information set and the second information set from the first SOAP message;

wherein the second information set is provided in the body of the first SOAP message, the method comprising: the server generating the second SOAP message by inserting the retrieved first information set into the header of the first SOAP message.

2. The method according to claim 1, further comprising the step of: the server sending the second SOAP message to a message mediation to invoke a service.

3. The method according to claim 2, wherein the second information set comprises service interface information necessary for invoking a service.

4. The method according to claim 1, wherein each of the at least one first information sets is associated with one unique endpoint, the method further comprising: the server retrieving the first information set using the unique endpoint.

5. The method according to claim 4, wherein the first SOAP message is encapsulated in a HTTP message and the unique endpoint is written into the header of the HTTP message as the destination address.

6. The method of claim 1, wherein the server stores the at least one first information set in a repository located in a message mediation application.

7. A system for generating a Simple Object Access Protocol (SOAP) message, comprising:

a memory having encoded thereon a repository, which pre-stores at least one first information sets, each first information set comprising property information that causes the server to dynamically route a message to a service realization end point; and a server operably connected to the memory and comprising a message handler configured to receive a first SOAP message, wherein the first SOAP message contains a second information set that contains at least one piece of service interface information, and wherein, the message handler is further configured to retrieve one of the at least one first information sets corresponding to the second information set from the repository, and generate a second SOAP message using the retrieved first information set and the first SOAP message;

wherein the second information set is provided in the body of the first SOAP message, and the message handler is further configured to generate the second SOAP message by inserting the retrieved first information set into the header of the first SOAP message.

8. The system according to claim 7, wherein the message handler is further configured to send the second SOAP message to a message mediation for invoking a service.

9. The system according to claim 8, wherein each first information set comprises property information, which is used by the message mediation to dynamically route the second SOAP message to a corresponding service realization endpoint.

10. The system according to claim 8, wherein, the second information set comprises service interface information necessary for invoking a service.

11. The system according to claim 7, wherein each of the at least one first information sets is associated with one unique endpoint, and the message handler is further configured to retrieve the first information sets using the unique endpoint.

12. The system according to claim 11, wherein the first SOAP message is encapsulated in a HTTP message and the unique endpoint is written into the header of the HTTP message as a destination address.

* * * * *